United States Patent
Barsheshet et al.

(10) Patent No.: US 7,283,478 B2
(45) Date of Patent: Oct. 16, 2007

(54) TRAFFIC ENGINEERING IN BI-DIRECTIONAL RING NETWORKS

(75) Inventors: Yossi Barsheshet, Givatayim (IL); Alex Levit, Tel-Aviv (IL)

(73) Assignee: Corrigent Systems Ltd., Tel Aviv (IL)

( * ) Notice: Subject to any disclaimer, the term of this patent is extended or adjusted under 35 U.S.C. 154(b) by 1029 days.

(21) Appl. No.: 10/211,066

(22) Filed: Aug. 2, 2002

(65) Prior Publication Data
US 2003/0103449 A1 Jun. 5, 2003

Related U.S. Application Data

(60) Provisional application No. 60/333,936, filed on Nov. 28, 2001.

(51) Int. Cl.
*H04L 12/28* (2006.01)

(52) U.S. Cl. .................. 370/238; 370/405; 370/406

(58) Field of Classification Search ............... 370/238, 370/405, 406
See application file for complete search history.

(56) References Cited

U.S. PATENT DOCUMENTS

| | | | |
|---|---|---|---|
| 5,461,611 A | 10/1995 | Drake et al. | |
| 5,581,703 A | 12/1996 | Baugher et al. | |
| 5,706,516 A | 1/1998 | Chang et al. | |
| 5,933,422 A | 8/1999 | Kusano et al. | |
| 6,021,263 A | 2/2000 | Kujoory et al. | |
| 6,169,783 B1 | 1/2001 | Brooks et al. | |
| 6,262,976 B1 | 7/2001 | McNamara | |
| 6,314,110 B1 | 11/2001 | Chin et al. | |
| 6,339,488 B1 | 1/2002 | Beshai et al. | |
| 6,370,121 B1 | 4/2002 | Hausman | |
| 6,400,681 B1 | 6/2002 | Bertin et al. | |
| 6,486,988 B1 | 11/2002 | Lewis et al. | |

(Continued)

OTHER PUBLICATIONS

Braden, et al., in IETF RFC 2205, "Resource ReServation Protocol (RVSP)—Version 1 Functional Specification", Sep. 1997.

(Continued)

*Primary Examiner*—Hassan Kizou
*Assistant Examiner*—Jay P. Patel
(74) *Attorney, Agent, or Firm*—Darby & Darby (57) ABSTRACT

A method for traffic engineering in a communication system made up of network nodes arranged in multiple interconnected networks, including at least one bi-directional ring network having an inner ring and an outer ring. The bi-directional ring network is defined as a multi-access network for purposes of a routing protocol used in the system. Constraint information is advertised with regard to connections on the inner and outer rings between the nodes within the at least one bi-directional ring network. Traffic flow is routed through the system in accordance with the routing protocol, so that the flow passes through the at least one bi-directional ring network on at least one of the connections on one of the inner and outer rings that is selected responsive to the constraint information.

16 Claims, 3 Drawing Sheets

U.S. PATENT DOCUMENTS

| | | | |
|---|---|---|---|
| 6,510,141 B1* | 1/2003 | Ramfelt et al. | 370/254 |
| 6,584,535 B1 | 6/2003 | Ouellet et al. | |
| 6,625,155 B1 | 9/2003 | Dziong | |
| 6,639,893 B1 | 10/2003 | Chikenji et al. | |
| 6,639,896 B1 | 10/2003 | Goode et al. | |
| 6,647,008 B1 | 11/2003 | Galand et al. | |
| 6,678,241 B1 | 1/2004 | Gai et al. | |
| 6,757,286 B1 | 6/2004 | Stone | |
| 6,801,506 B1 | 10/2004 | Dey | |
| 6,826,158 B2 | 11/2004 | Seaman et al. | |
| 6,922,394 B2 | 7/2005 | Kajiwara | |
| 6,934,259 B2 | 8/2005 | Klincewicz et al. | |
| 6,952,397 B2* | 10/2005 | Mor et al. | 370/223 |
| 6,965,612 B2 | 11/2005 | Chohan et al. | |
| 6,992,975 B1* | 1/2006 | Daniel et al. | 370/222 |
| 7,035,279 B2* | 4/2006 | Bruckman | 370/460 |
| 7,042,846 B2* | 5/2006 | Bauer | 370/238 |
| 7,058,008 B1 | 6/2006 | Wilson et al. | |
| 7,079,544 B2 | 7/2006 | Wakayama et al. | |
| 7,158,486 B2 | 1/2007 | Rhodes | |
| 7,161,899 B2* | 1/2007 | Limaye et al. | 370/223 |
| 2002/0085548 A1 | 7/2002 | Ku et al. | |
| 2002/0181479 A1 | 12/2002 | Okuno | |
| 2003/0002443 A1 | 1/2003 | Basso et al. | |
| 2003/0145108 A1 | 7/2003 | Joseph et al. | |
| 2003/0158930 A1 | 8/2003 | Mc Bride | |
| 2003/0223428 A1 | 12/2003 | Gonzalez et al. | |
| 2004/0052274 A1 | 3/2004 | Wang et al. | |
| 2004/0071089 A1 | 4/2004 | Bauer et al. | |
| 2004/0076176 A1 | 4/2004 | Kfir | |
| 2004/0105459 A1 | 6/2004 | Mannam | |
| 2004/0202157 A1 | 10/2004 | Chase et al. | |
| 2005/0030948 A1 | 2/2005 | Wyatt | |

OTHER PUBLICATIONS

Andersson, et al., in IETF RFC 3036, "LDP Specification" Jan. 2001.

Katz, et al., "Traffic Engineering Extensions to OSPF", (draft-katz-yeung-ospf-traffic-06.txt), Oct. 2001.

Li, et al., "IS-IS Extensions FOR Traffic Engineering", (published as draft-ietf-isis-traffic-04.txt), Aug. 2001.

U.S. Appl. No. 60/333,936, filed Nov. 28, 2001, entitled "TE extensions for RPR."

Official Action for U.S. Appl. No. 10/054,845, dated Nov. 28, 2005.

Dziong, et al., "A Framework For Bandwidth Management In ATM Networks-Aggregate Equivalent Bandwidth Estimation Approach", IEEE/ACM transactions on networking, vol. 5, No. 1, Feb. 1997.

Inverse Multiplexing over ATM, Strategic Technologies Group, Jul. 12, 2001.

The PPP Multilink Protocol (MP) Standard, RFC 1990, The Internet Engineering Task Force, www.ietf.org, Aug. 1996.

Moy, "OSPF", Version 2, published as Request for Comments (RFC) 2328 of the Internet Engineering Task Force (IETF) Network Working Group, Apr. 1998.

Awduche, et al., "Requirement for Traffic Engineering Over MPLS", published as IETF RFC 2702, Sep. 1999.

Jogalekar, et al., "IP over Resilient Packet Rings", (Internet Draft, draft-jogalekar-iporpr-00).

Herrera, et al., "A Framework for IP over Packet Transport Rings", (Internet Draft, draft-ietf-iporprframework-00).

Tsiang, et al., in IETF RFC 2892, 2000.

* cited by examiner

TRAFFIC ENGINEERING IN BI-DIRECTIONAL RING NETWORKS

CROSS-REFERENCE TO RELATED APPLICATION

This application claims the benefit of U.S. Provisional Patent Application No. 60/333,936, filed Nov. 28, 2001, which is incorporated herein by reference.

FIELD OF THE INVENTION

The present invention relates generally to communication networks, and specifically to methods and devices for routing traffic flows in ring networks.

BACKGROUND OF THE INVENTION

The Open Shortest Path First (OSPF) protocol is a link-state routing protocol used for internet routing. OSPF is described in detail by Moy in "OSPF Version 2, published as Request for Comments (RFC) 2328 of the Internet Engineering Task Force (IETF) Network Working Group (April, 1998), which is incorporated herein by reference. This document is available at www.ietf.org, as are the other IETF RFC and draft documents mentioned below. OSPF is used by a group of Internet Protocol (IP) routers in an Autonomous System to exchange information regarding the system topology. (The term "Autonomous System" is used in the art to denote a group of routers exchanging routing information via a common routing protocol.) Each OSPF router maintains an identical topology database. Based on this database, the routers calculate their routing tables by constructing a shortest-path tree to each of the other routers.

Each individual piece of the topology database maintained by the OSPF routers describes the local state of a particular router in the Autonomous System. This "local state" includes information such as the router's usable interfaces and reachable neighbors. The routers distribute their local state information by transmitting a link state advertisement (LSA). Packets containing link state advertisements are flooded throughout the routing domain. The other routers receive these packets and use the LSA information to build and update their databases.

OSPF routes IP packets based solely on the destination IP address in the IP packet header. A cost is associated with the output side of each router interface and is used by the router in choosing the least costly path for the packets. This cost is configurable by the system administrator. The lower the cost, the more likely the interface is to be used to forward data traffic. For the purposes of cost calculation and routing, OSPF recognizes two types of "networks" (which may be organized as IP networks, subnets or supernets): point-to-point networks, which connect a single pair of routers; and multi-access networks, supporting many (two or more) attached routers. Each pair of routers on a multi-access network is assumed to be able to communicate directly with one another. An Ethernet is an example of a multi-access network. Each multi-access network includes a "designated router," which is responsible for generating LSAs, as well as certain other protocol functions.

Figure 1:
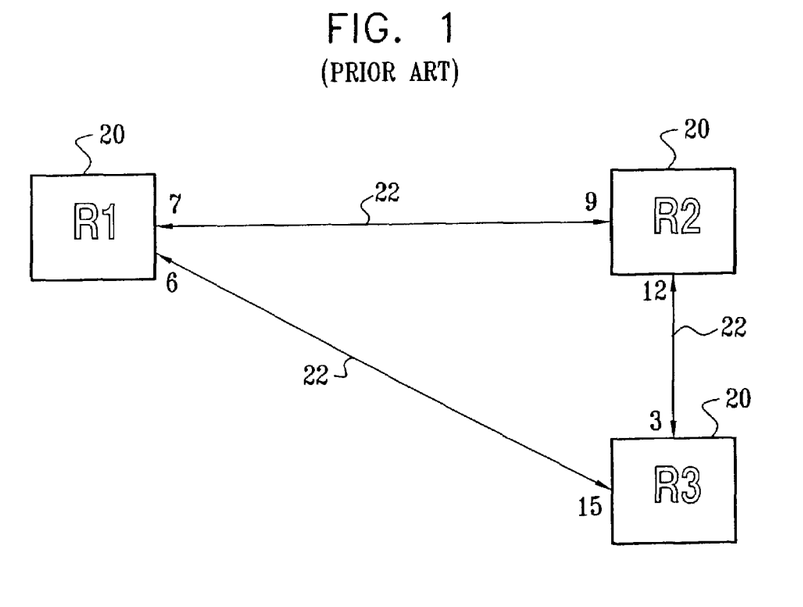
FIGS. 1 and 2 are block diagrams that schematically illustrate OSPF networks, as are known in the art.
Figure 2:
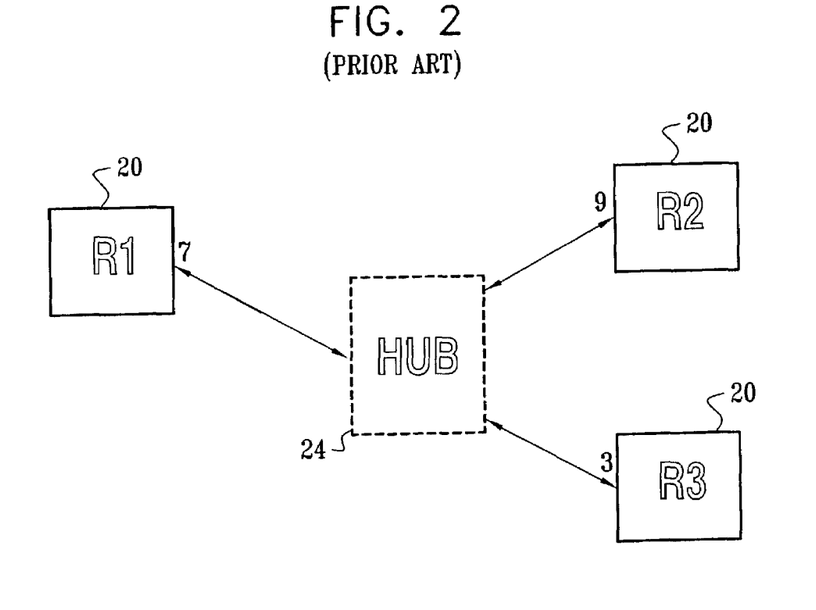

FIGS. 1 and 2 are schematic illustrations of OSPF networks, illustrating how link costs are assigned and computed in such networks. FIG. 1 shows three routers 20, labeled R1, R2 and R3, connected by point-to-point networks 22. Each interface of each of the routers has its own cost, which is shown in the figure at the point of connection of each of routers 20 to each of networks 22. It will be seen that different directions on the same point-to-point network can have different costs assigned to them. Based on these costs, for example, R3 will choose to route packets to R1 via R2, since the cost of this path is 3+9=12, which is less than the cost (15) of sending the packets from R3 to R1 directly.

In FIG. 2, routers 20 are connected by a multi-access network, represented by a hub 24 through which every router is considered to communicate with every other router. The hub may be real or virtual, depending on the underlying physical structure of the network, but this distinction is not recognized by OSPF. In the multi-access network, there is a single cost assigned to the network interface of each router, so that the cost of communicating with any of the other routers in the network is the same. Thus, for example, the cost of routing packets from R1 to either R2 or R3 is 7. OSPF does not recognize or assign costs to any different paths that may exist between nodes within the multi-access network.

Traffic engineering (TE) is concerned with performance optimization of operational networks, typically by controlling Internet traffic to achieve specific performance objectives. The principles and objectives of TE are described, for example, by Awduche et al., in "Requirements for Traffic Engineering Over MPLS," published as IETF RFC 2702 (September, 1999), which is incorporated herein by reference. Internet traffic engineering attempts to facilitate efficient and reliable network operations while simultaneously optimizing network resource utilization and traffic performance. TE has become an indispensable function in many large Autonomous Systems because of the high cost of network assets and the commercial and competitive nature of the Internet. Key traffic-oriented performance objectives include minimization of packet loss, minimization of delay, maximization of throughput, and enforcement of service level agreements. Resource-oriented TE functions include load-balancing and efficient bandwidth management, to ensure that subsets of network resources do not become overutilized and congested while other subsets along alternate feasible paths remain underutilized.

Although OSPF allows the system administrator to assign interface costs, as described above, this feature is not sufficient to support full TE-based routing in an Autonomous System. For this purpose, Katz et al. suggest extending the link state attributes of OSPF, in an IETF Internet Draft entitled "Traffic Engineering Extensions to OSPF," (draft-katz-yeung-ospf-traffic-06.txt, October, 2001), which is incorporated herein by reference. The OSPF TE extensions described by Katz et al. can be used to build an extended link state database, which can then be used for global traffic engineering, as well as local constraint-based routing.

In order to distribute the extended OSPF link attributes among the routers, Katz et al. define a new LSA type and a number of Type/Length/Value (TLV) triplets that can be included in the payload of a LSA. Each LSA contains one top-level TLV, which identifies either a router or a link. For link TLVs, Katz et al. define a set of sub-TLVs, which can be used to advertise TE-related constraints on the link, as shown below in Table I:

TABLE I

LINK SUB-TLVS IN OSPF-TE

| TLV type | Name | Description |
|---|---|---|
| 1 | Link type | Point-to-point or multi-access |
| 2 | Link ID | Identifies the neighboring router at the other end of the link. (The advertising router is identified in the LSA header.) |
| 3 | Local interface | IP address(es) of the interface corresponding to this link. (If there are |

TABLE I-continued

LINK SUB-TLVS IN OSPF-TE

| TLV type | Name | Description |
|---|---|---|
| | IP address | multiple local addresses on the link, they are all listed in this sub-TLV.) |
| 4 | Remote interface IP address | IP address(es) of the neighbor's interface corresponding to this link. |
| 5 | Traffic engineering metric | Link metric for TE purposes - may be the same as or different from the standard OSPF link metric. |
| 6 | Maximum bandwidth | Maximum bandwidth that can be used on this link in this direction (from the advertising router to its neighbor). |
| 7 | Maximum reservable bandwidth | Maximum bandwidth that may be reserved on this link - may be greater than the maximum bandwidth if the link is oversubscribed. |
| 8 | Unreserved bandwidth | Amount of bandwidth not yet reserved at each of eight different priority levels. |
| 9 | Resource class/color | Specifies administrative group membership for this link, in terms of a bit mask. |

Further details of the LSA and TLV format are described in the above-mentioned draft.

Bi-directional network ring topologies are gaining in popularity, particularly in Internet Protocol (IP) networks. Such networks provide efficient bandwidth utilization by enabling data to be transferred between any pair of nodes in either direction around the ring, while maintaining fast protection against faults. The two opposing traffic directions are commonly referred to as an inner ring and an outer ring. It will be understood, however, that in the context of the present patent application and in the claims, the terms "inner" and "outer," as well as "clockwise" and "counter-clockwise," are used arbitrarily to distinguish between the two opposing directions of packet flow in a ring network. These terms are chosen solely for convenience of explanation, and do not necessarily bear any relation to the physical characteristics of the network.

The leading bi-directional protocol for high-speed packet rings is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in IETF RFC 2892. These documents are incorporated herein by reference.

Using protocols such as these, each node in a ring network can communicate directly with all other nodes through either the inner or the outer ring, using the appropriate Media Access Control (MAC) addresses of the nodes. Each packet sent over one of the rings carries a header indicating its destination node. The destination node recognizes its address in the header and strips the packet from the ring. All other nodes pass the packet onward transparently around the ring. Multicast packets may also be delivered over the rings in a similar fashion. Thus, the bi-directional ring can be regarded as a multi-access network for the purposes of OSPF.

In terms of traffic engineering, however, there are basic differences between bi-directional ring networks and legacy multi-access networks, such as Ethernets. For example, a packet transmitted on the ring network does not load the bandwidth of the entire network, as in legacy networks, but rather loads only the segments between the source and destination nodes on the ring (inner or outer) over which the packet travels. This feature of the ring network is an important consideration in traffic engineering and should be taken into account in routing of packets through the ring network. OSPF (including the extensions proposed by Katz et al.), however, provides no facilities for advertising or using information regarding segments within a multi-access network.

SUMMARY OF THE INVENTION

It is an object of some aspects of the present invention to provide improved methods and systems for traffic engineering in bi-directional ring networks.

In preferred embodiments of the present invention, a routing protocol enables network routers to exchange traffic engineering-related information regarding individual segments and links within a bi-directional ring network. Preferably, the protocol is an extension of the above-mentioned OSPF protocol, but the principles of the present invention are equally applicable to other network routing protocols. For routing purposes, the protocol treats the ring network as a multi-access network, so that all the nodes in the ring network can be considered to belong to the same subnet. Unlike conventional OSPF and other network routing protocols known in the art, however, the present invention enables the router to distinguish between the alternative directions of traffic within the ring and to select the direction in which to route a given traffic flow based on traffic engineering considerations. The invention is applicable both to routing within a single ring network and to routing in a system that includes multiple interconnected rings networks.

There is therefore provided, in accordance with a preferred embodiment of the present invention, in a communication system made up of network nodes arranged in multiple interconnected networks, including at least one bi-directional ring network having an inner ring and an outer ring, a method for traffic engineering, including:

defining the at least one bi-directional ring network as a multi-access network for purposes of a routing protocol used in the system;

advertising constraint information with regard to connections on the inner and outer rings between the nodes within the at least one bi-directional ring network; and routing a traffic flow through the system in accordance with the routing protocol, so that the flow passes through the at least one bi-directional ring network on at least one of the connections on one of the inner and outer rings that is selected responsive to the constraint information.

Typically, each of the connections includes a link between a source node and a destination node on one of the inner and outer rings, the link including one or more segments of the ring. Preferably, advertising the constraint information includes advertising a count of the segments that make up the link. Alternatively, each of the connections includes a segment of one of the inner and outer rings that connects two of the nodes that are mutually adjacent.

In a preferred embodiment, advertising the constraint information includes advertising a bandwidth constraint that is applicable to one the inner and the outer rings.

In another preferred embodiment, advertising the constraint information includes advertising an indication that one of the inner and outer rings is to be selected to carry the traffic flow. Preferably, advertising the indication includes designating that a class of service to which the traffic flow belongs is to be routed over the selected one of the rings.

Preferably, the communication system includes an autonomous system, and the nodes include Internet Protocol (IP) routers, and the routing protocol includes an Open Shortest Path First (OSPF) protocol.

There is also provided, in accordance with a preferred embodiment of the present invention, a communication system, including:

a plurality of network nodes; and communication links connecting the nodes so as to define multiple interconnected networks, including at least one bi-directional ring network having an inner ring and an outer ring, wherein the nodes are adapted to route a traffic flow through the system in accordance with a routing protocol used in the system, for purposes of which protocol the at least one bi-directional ring network is defined as a multi-access network, and wherein the nodes are adapted to advertise constraint information with regard to connections on the inner and outer rings between the nodes within the at least one bi-directional ring network, and to select, responsive to the constraint information, at least of the connections on one of the inner and outer rings over which the flow is to pass through the at least one bi-directional ring network.

The present invention will be more fully understood from the following detailed description of the preferred embodiments thereof, taken together with the drawings in which:

DETAILED DESCRIPTION OF PREFERRED EMBODIMENTS

Figure 3:
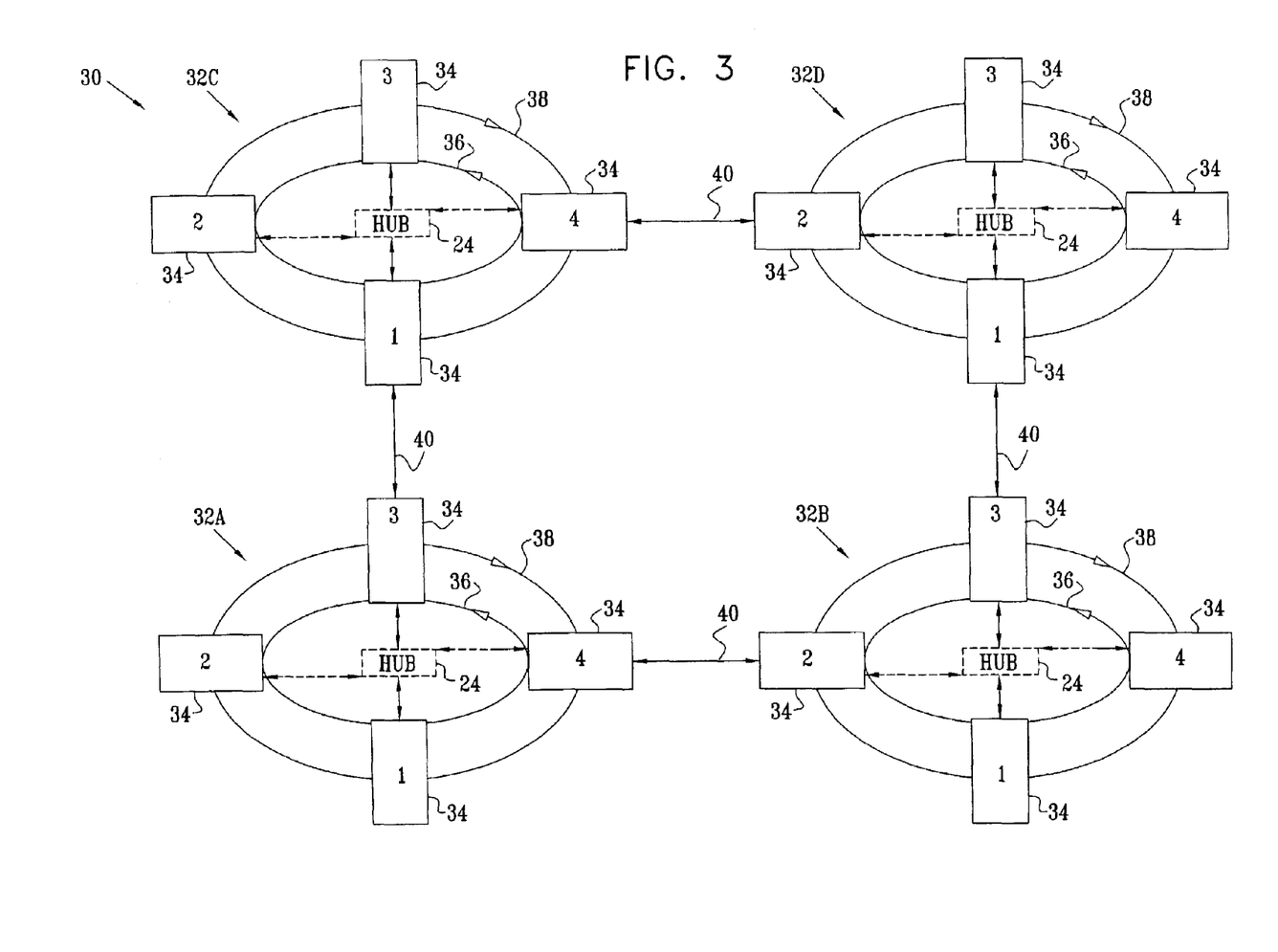
FIG. 3 is a block diagram that schematically illustrates a communication system made up of bi-directional ring networks in which routing is based on traffic engineering, in accordance with a preferred embodiment of the present invention.

FIG. 3 is a block diagram that schematically illustrates an autonomous communication system 30 made up of nodes 34 arranged in multiple bi-directional ring networks 32A, 32B, 32C and 32D, which are preferably configured as RPR networks, as described above. The individual ring networks are referred to collectively hereinafter simply as ring network 32. Each ring network comprises an inner ring 36 and an outer ring 38, corresponding to the two opposing directions of traffic flow supported on the network. Each pair of adjacent nodes in a given ring network is thus interconnected by two network segments: an inner ring (counter-clockwise) segment and an outer ring (clockwise) segment.

The different ring networks are linked by point-to-point connections 40 between nodes 34 in the different networks, as shown in the figure. The topology of system 30 is shown here by way of example, to illustrate aspects of the present invention. It will be understood, however, that the present invention is in no way limited in its applicability to this topology, and may equally be applied in any network system that includes one or more bi-directional rings.

Nodes 34 route packet flows in system 30 based on traffic engineering (TE) information and considerations, in accordance with a preferred embodiment of the present invention. In order to meet TE objectives, the operator of system 30 typically imposes constraints on data flows or tunnels established between nodes within each of ring networks 32, as well as between nodes on different ring networks. These constraints may include, for example, load balancing, so that segment bandwidths are loaded as evenly as possible, or number of hops, so that traffic flows are routed through the smallest possible number of nodes. As another example, the operator may decide that certain classes of service are forwarded over inner rings 36, while other classes are forwarded over outer rings 38. Typically, TE constraints also take into account protection mechanisms, such as wrapping or steering of flows, which are activated upon failure of a node or segment.

Routing in system 30 is preferably based on OSPF, as described above, with extended TE features for ring networks as described below. Alternatively, other routing protocols may also be used. For routing purposes, each ring network 32 is treated as a multi-access network (and for this reason is shown as having its own virtual hub 24). A flow routed from node 1 in network 32A (referred to hereinafter as node A.1) to node 3 in network 32D (node D.3) could travel over any of a large number of different paths, for example:

A.1 (inner ring)→A.4→B.2 (inner ring)→B.3→D.1 (inner ring)→D.3

A.1 (inner ring)→A.4→B.2 (inner ring)→B.3→D.1 (outer ring)→D.3

A.1 (inner ring)→A.4→B.2 (outer ring)→B.3→D.1 (inner ring)→D.3

A.1 (outer ring)→A.4→B.2 (outer ring)→B.3→D.1 (inner ring)→D.3

. . .

. . .

. . .

A.1 (inner ring)→A.3→C.1 (inner ring)→C.4→D.2 (inner ring)→D.3

A.1 (inner ring)→A.3→C.1 (inner ring)→C.4→D.2 (outer ring)→D.3

A.1 (inner ring)→A.3→C.1 (outer ring)→C.4→D.2 (inner ring)→D.3

A.1 (outer ring)→A.3→C.1 (outer ring)→C.4→

. . .

. . .

. . .

OSPF as currently conceived provides no means for the operator to constrain the flow to one path or another within each network 32. This objective could be achieved by treating each segment of each ring 36 and 38 as a separate point-to-point network link. This solution, however, requires that each segment be defined as its own IP subnet, which in large autonomous systems will incur a tremendous burden in terms of OSPF protocol communications and routing.

Instead, in system 30, each ingress node is able to compute a full routing path to each egress node using TE constraints regarding network topology and link attributes throughout the system, while still treating each network 32 as a multi-access network. The system operator may use these constraints to impose explicit routes on some or all traffic flows through the system. The constraint information is preferably distributed using an extension to OSPF that accommodates the special attributes of bi-directional ring networks, as described below. Based on this constrained routing, traffic-engineered flow paths through system 30 may be established using any suitable signaling protocol known in the art, such as the Resource Reservation Protocol (RSVP), or the Label Distribution Protocol (LDP) used in Multi Protocol Label Switching (MPLS). RSVP is described by Braden et al. in IETF RFC 2205, entitled "Resource ReSerVation Protocol (RSVP)—Version 1 Functional Specification" (September, 1997), while LDP is described by Andersson et al. in IETF RFC 3036, entitled "LDP Specification" (January, 2001) Both of these documents are incorporated herein by reference.

Figure 4:
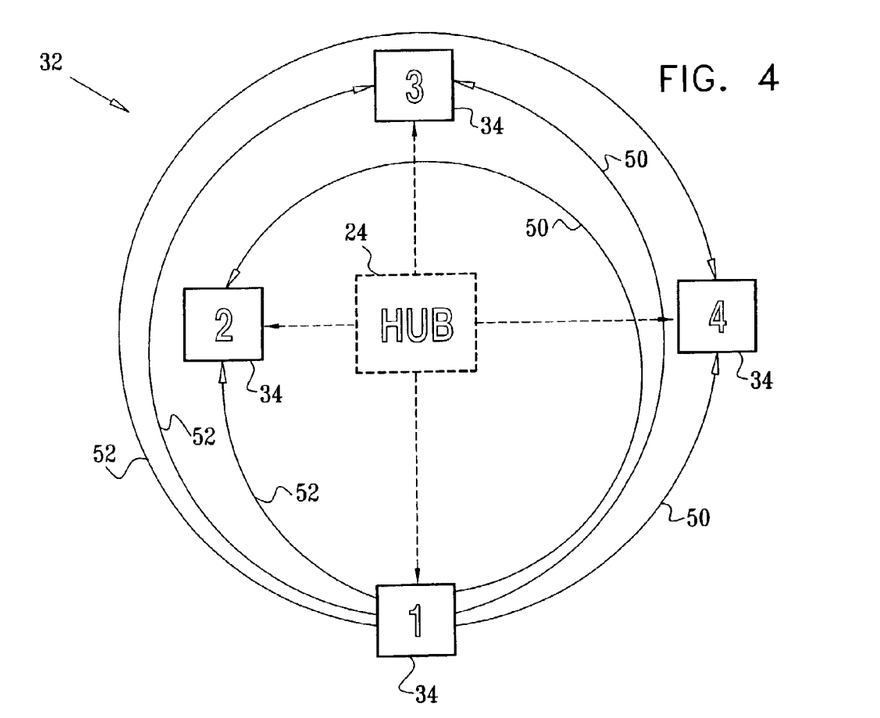
FIG. 4 is a block diagram that schematically illustrates links used for traffic engineering in a bi-directional ring network, in accordance with a preferred embodiment of the present invention.

FIG. 4 is a block diagram that schematically illustrates a method for defining and distributing constraint information with respect to RPR links in each of ring networks 32, in accordance with a preferred embodiment of the present invention. (A segment-based approach is described below with reference to FIG. 5.) Each node 34 in each ring network 32 determines constraint information regarding every link connecting it to the other nodes within the ring network in which the node is located. This information may include, for example, the number of hops in each link and/or bandwidth constraints. The links include inner ring links 50 and outer ring links 52 from each node to each of the other nodes in network 32, as shown in FIG. 4.

The designated router in each ring network 32 advertises the link constraint information for all the links in its network that serve as gateways to other networks, such as nodes A.3 and A.4, B.2 and B.3, etc., in FIG. 3. The constraint information regarding the RPR links is advertised using new TLV types, which are listed below in Table II. Some of the sub-TLVs in the table are similar to those defined by Katz et al., but others are unique to RPR networks. Information regarding point-to-point links 40 (FIG. 3) is determined and advertised, as well, as is known in the art. The method of transmitting and receiving these advertisements can be substantially similar to that described by Katz et al. in the above-mentioned Internet draft. When changes occur in the network topology or resource constraints, they are advertised in like manner.

TABLE II

RPR-LINK SUB-TLVS FOR OSPF

| TLV type | Name | Description |
|---|---|---|
| 1 | Link type | New link type: "RPR-Link." |
| 2 | Link ID | Identification of the designated router and the direction of the link (inner or outer ring). |
| 3 | Local interface IP address | IP address(es) of the interface corresponding to this link. If there are multiple local addresses on the link, they are all listed. |
| 4 | Remote interface IP address | IP address(es) of the neighbor's interface corresponding to this link. |
| 5 | Traffic engineering metric | Link metric for TE purposes - may be the same as or different from the standard OSPF link metric. |

TABLE II-continued

RPR-LINK SUB-TLVS FOR OSPF

| TLV type | Name | Description |
|---|---|---|
| 6 | Maximum bandwidth | The maximum bandwidth that can be used on this link in this direction (actually of the most loaded segment in the link), preferably per class of service. |
| 7 | Maximum reservable bandwidth | The maximum bandwidth that may be reserved on this link in this direction, preferably per class of service, also considering protection needs. |
| 8 | Unreserved bandwidth | Amount of bandwidth not yet reserved at each class of service. |
| 9 | Resource class/color | Specifies administrative group membership for this link, in terms of a bit mask. |
| 10 | Min hops | Number of hops from source to destination. |

As a result of advertising the RPR link TLVs, every node in system 30 will know the constraints applicable to all the links connecting it to the other nodes in its own ring network 32, and also to all the links it may use in routing traffic to nodes in other ring networks. For example, node A.1 will have constraint information regarding the links A.1→A.2, A.1→A.3, A.1→A.4, B.2→B.X, B.3→B.X, C.1→C.X, C.4→C.X, D.1→D.X, D.2→D.X, on both the inner and outer rings in each network. (Here "Y.X" means any node on ring network Y.) Node A.1 will then be able to choose its routing paths based on any applicable TE considerations, such as reducing the number of hops, load balancing, service differentiation or other factors.

Figure 5:
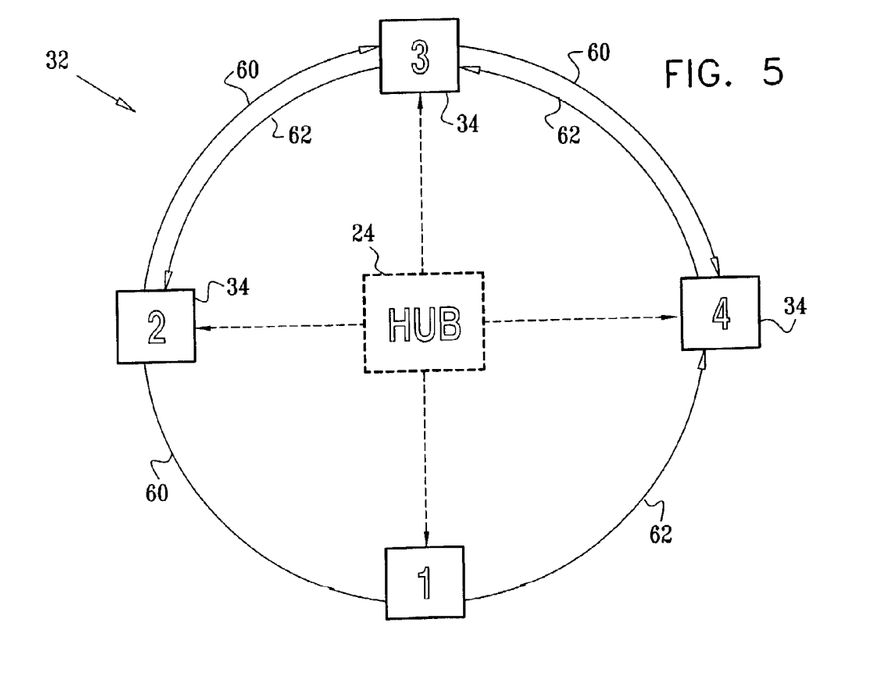
FIG. 5 is a block diagram that schematically illustrates segments used for traffic engineering in a bi-directional ring network, in accordance with a preferred embodiment of the present invention.

FIG. 5 is a block diagram that schematically illustrates a method for defining and distributing constraint information with respect to RPR segments in each of ring networks 32, in accordance with another preferred embodiment of the present invention. In this case, each node 34 determines constraint information with respect to outer ring segments 60 and inner ring segments 62 between the nodes in its own ring network 32. The designated router advertises this segment constraint information to the other nodes in system 30. Then, any node routing a traffic flow through the system can select the segments 60 and/or 62 over which to sent the flow depending on the applicable constraints.

Table III lists new TLV types that can be used to distribute the segment constraint information:

TABLE III

RPR-SEGMENT SUB-TLVS FOR OSPF

| TLV type | Name | Description |
|---|---|---|
| 1 | Link type | New link type: "RPR-Segment." |
| 2 | Link ID | Identification of the designated router and the direction of the segment (inner or outer) |
| 3 | Local interface IP address | IP address(es) of the interface transmitting to this segment. If there are multiple local addresses on the segment, all are listed. |
| 4 | Remote interface IP address | IP address(es) of the neighbor's interface corresponding to this segment. |

TABLE III-continued

RPR-SEGMENT SUB-TLVS FOR OSPF

| TLV type | Name | Description |
|---|---|---|
| 5 | Traffic engineering metric | Link metric for TE purposes - may be the same as or different from the standard OSPF link metric. |
| 6 | Maximum bandwidth | Maximum bandwidth that can be used on this segment, preferably per class of service. |
| 7 | Maximum reservable bandwidth | Maximum bandwidth that may be reserved on this segment, preferably per class of service. |
| 8 | Unreserved bandwidth | Amount of bandwidth not yet reserved for each class of service. |
| 9 | Resource class/color | Specifies administrative group membership for this segment, in terms of a bit mask. |

Although the preferred embodiments described above are based on OSPF, the principles of the present invention may similarly be applied to other routing protocols. For example, Li et al. describe traffic engineering extensions for Intermediate System to Intermediate System routing in an IETF draft entitled "IS-IS extensions for Traffic Engineering" (published as draft-ietf-isis-traffic-04.txt, August, 2001), which is incorporated herein by reference. The TLV types described above may similarly be implemented, mutatis mutandis, in the IS-IS context. Other implementations of the principles of the present invention will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. In a communication system made up of network nodes arranged in multiple interconnected networks, including a bi-directional ring network having an inner ring and an outer ring, a method for traffic engineering, comprising:
defining the bi-directional ring network as a multi-access network for purposes of a routing protocol used in the system;
advertising constraint information to the nodes in the system outside the bi-directional ring network with regard to connections on the inner and outer rings between the nodes within the bi-directional ring network, the constraint information comprising a bandwidth constraint that is applicable to one of the inner and the outer rings and is associated with a protection mechanism comprising wrapping or steering of traffic flows between the inner and outer rings; and
routing a traffic flow from one of the nodes in the system outside the bi-directional ring network through the system in accordance with the routing protocol, so that the flow passes through the bi-directional ring network on at least one of the connections on one of the inner and outer rings that is selected responsive to the constraint information.

2. A method according to claim 1, wherein each of the connections comprises a link between a source node and a destination node on one of the inner and outer rings, the link comprising one or more segments of the ring.

3. A method according to claim 2, wherein advertising the constraint information comprises advertising a count of the segments that make up the link.

4. A method according to claim 1, wherein each of the connections comprises a segment of one of the inner and outer rings that connects two of the nodes that are mutually adjacent.

5. A method according to claim 1, wherein advertising the constraint information comprises advertising an indication that one of the inner and outer rings is to be selected to carry the traffic flow.

6. A method according to claim 5, wherein advertising the indication comprises designating that a class of service to which the traffic flow belongs is to be routed over the selected one of the rings.

7. A method according to claim 1, wherein the communication system comprises an autonomous system, and the nodes comprise Internet Protocol (IP) routers, and wherein the routing protocol comprises an Open Shortest Path First (OSPF) protocol.

8. A communication system, comprising:
a plurality of network nodes; and
communication links connecting the nodes so as to define multiple interconnected networks, including a bi-directional ring network having an inner ring and an outer ring,
wherein the nodes are adapted to route a traffic flow from one of the nodes in the system outside the bi-directional ring network through the system in accordance with a routing protocol used in the system, for purposes of which protocol the bi-directional ring network is defined as a multi-access network, and
wherein the nodes are adapted to advertise to the nodes in the system outside the bi-directional ring network constraint information with regard to connections on the inner and outer rings between the nodes within the bi-directional ring network, and to select, responsive to the constraint information, at least of the connections on one of the inner and outer rings over which the flow is to pass through the bi-directional ring network, and
wherein the constraint information comprises a bandwidth constraint that is applicable to one of the inner and the outer rings and is associated with a protection mechanism comprising wrapping or steering of traffic flows between the inner and outer rings.

9. A system according to claim 8, wherein each of the connections comprises one of the links between a source node and a destination node on one of the inner and outer rings, wherein the one of the links comprises one or more segments of the ring.

10. A system according to claim 9, wherein the constraint information comprises a count of the segments that make up the one of the links.

11. A system according to claim 8, wherein each of the connections comprises a segment of one of the inner and outer rings that connects two of the nodes that are mutually adjacent.

12. A system according to claim 8, wherein the constraint information comprises an indication that one of the inner and outer rings is to be selected to carry the traffic flow.

13. A system according to claim 12, wherein the indication comprises a designation that a class of service to which the traffic flow belongs is to be routed over the selected one of the rings.

14. A system according to claim 8, wherein the communication system comprises an autonomous system, and the nodes comprise Internet Protocol (IP) routers, and wherein the routing protocol comprises an Open Shortest Path First (OSPF) protocol.

15. A method according to claim 1, wherein routing the traffic flow comprises routing the traffic flow from a first node on a first bi-directional ring network to a second node on a second bi-directional ring network responsive to the constraint information regarding the second bi-directional ring network.

16. A system according to claim 8, wherein the nodes are adapted to route the traffic flow from a first node on a first bi-directional ring network to a second node on a second bi-directional ring network responsive to the constraint information regarding the second bi-directional ring network.

* * * * *